US006983601B2

(12) United States Patent
Koshoffer (10) Patent No.: US 6,983,601 B2
(45) Date of Patent: Jan. 10, 2006

(54) METHOD AND APPARATUS FOR GAS TURBINE ENGINES (75) Inventor: John Michael Koshoffer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 10/856,902

(22) Filed: May 28, 2004

(65) Prior Publication Data

US 2005/0262847 A1 Dec. 1, 2005

(51) Int. Cl.
F02K 3/10 (2006.01)
(52) U.S. Cl. ............................ 60/761; 60/772; 60/762; 60/764
(58) Field of Classification Search ................. 60/761, 60/762, 262, 263, 770, 772, 765, 766, 784
See application file for complete search history.

(56) References Cited

U.S. PATENT DOCUMENTS

| 2,603,945 | A | * | 7/1952 | Brown ......................... 60/761 |
| 2,674,845 | A | * | 4/1954 | Pouchot ...................... 60/761 |
| 2,862,359 | A | * | 12/1958 | Spears, Jr. .................... 60/739 |
| 3,667,680 | A | * | 6/1972 | Weed ..................... 239/265.17 |
| 4,686,826 | A | * | 8/1987 | Koshoffer et al. ............ 60/762 |
| 4,798,048 | A | * | 1/1989 | Clements ..................... 60/764 |
| 4,901,527 | A | * | 2/1990 | Nash et al. .................... 60/765 |
| 4,920,742 | A | * | 5/1990 | Nash et al. .................... 60/799 |
| 5,001,898 | A | * | 3/1991 | Holladay ..................... 60/765 |
| 5,012,638 | A | * | 5/1991 | Grieb et al. .................. 60/224 |
| 5,212,945 | A | * | 5/1993 | Habrard ..................... 60/226.1 |
| 5,297,391 | A | * | 3/1994 | Roche ........................ 60/740 |
| 5,335,490 | A | | 8/1994 | Johnson et al. |
| 5,367,874 | A | * | 11/1994 | Auffret et al. ................ 60/766 |
| 5,385,015 | A | * | 1/1995 | Clements et al. ............. 60/765 |
| 5,396,761 | A | * | 3/1995 | Woltmann et al. ........ 60/39.827 |
| 5,396,763 | A | * | 3/1995 | Mayer et al. ................. 60/765 |
| 5,400,589 | A | * | 3/1995 | Mahias et al. ................ 60/762 |
| 5,617,717 | A | * | 4/1997 | Asquith et al. ............... 60/761 |
| 5,685,140 | A | * | 11/1997 | Clements et al. ............. 60/204 |
| 5,813,221 | A | * | 9/1998 | Geiser et al. ................. 60/762 |
| 5,867,980 | A | * | 2/1999 | Bartos ........................ 60/226.3 |
| 6,038,852 | A | * | 3/2000 | Celi ............................ 60/761 |
| 6,098,401 | A | * | 8/2000 | Alassoeur et al. ............. 60/763 |
| 6,415,609 | B1 | * | 7/2002 | Vacek et al. .................. 60/761 |
| 6,442,930 | B1 | * | 9/2002 | Johnson et al. ............. 60/226.1 |
| 6,463,739 | B1 | * | 10/2002 | Mueller et al. ............... 60/765 |
| 6,668,541 | B2 | * | 12/2003 | Rice et al. .................... 60/207 |
| 6,715,983 | B2 | | 4/2004 | Koshoffer et al. |
| 2004/0216444 | A1 | * | 11/2004 | Lovett ........................ 60/204 |
| 2004/0226298 | A1 | * | 11/2004 | Snyder et al. ................ 60/761 |

* cited by examiner

Primary Examiner—Cheryl Tyler
Assistant Examiner—William H. Rodriguez
(74) Attorney, Agent, or Firm—Armstrong Teasdale LLP; William Scott Andes (57) ABSTRACT A method for fabricating an augmentor includes fabricating an outer casing having at least one channel defined therein, fabricating a centerbody having at least one channel defined therein, fabricating a plurality of turbine frame vanes, wherein each turbine frame vane includes a first sidewall having a first channel defined therein, a second sidewall having a second channel defined therein, and at least one cross-fire tube extending between the first sidewall and the second sidewall, and coupling the plurality of turbine frame vanes to the augmentor outer casing and to the centerbody such that the first sidewall first channel formed on a first turbine frame vane, the second sidewall second channel formed on a second turbine frame vane, the augmentor channel, and the centerbody channel define a substantially contiguous trapped vortex chamber.

20 Claims, 5 Drawing Sheets

METHOD AND APPARATUS FOR GAS TURBINE ENGINES

BACKGROUND OF THE INVENTION

This application relates generally to gas turbine engines and, more particularly, to guide vane assemblies for gas turbine engines.

At least some known aircraft gas turbine engines include a compressor, a combustor, a turbine, and an augmentor or "afterburner". Airflow entering the compressor is compressed and directed to the combustor where it is mixed with fuel and ignited, producing hot combustion gases used to drive the turbine. As the performance demands of aircraft have increased, performance demands of the engines have also increased. Initially augmentors or "afterburners" were added to improve thrust. As range demands increased, low pressure rotors were added providing higher mass flow resulting in increased thrust at better specific fuel consumption. This demand for increased thrust prevailed with adding augmentation, "afterburning" to the bypass air. Additionally, mission demands increased for multi-role weapon systems. For example, engines are being designed to transition between conventional take-off and landing (CTOL) operations, as well as, short-takeoff and vertical landing (STOVL) operations. Augmentors are used in gas turbine engines to increase thrust as needed in a flight envelope and are located downstream from the turbomachinery. Additional thrust is produced within the augmentor when oxygen contained within both the core gas flow and the bypass air of the engine is mixed with fuel and burned. An exemplary afterburning turbofan engine provides provisions to burn the core gases and fan air sequentially. These applications provide the highest level of specific thrust as they consume the highest percentage of oxygen including the majority of the bypass air including that which is used for cooling.

At least one known engine augmentor includes a plurality of radial fuel spray bars and a combination of radial and circumferential flame holders, e.g. V-gutters, that are positioned directly in the core gas path to deliver the fuel in an circumferentially and radially distributed manner and to maintain the flame once ignited. An advantage of the radial fuel spray bars is that it is possible to evenly distribute fuel about the annulus of the augmentor at any particular radial and circumferential position. The combination of radial spraybars with their circumferential spacing with radially distributed holes allows for fine tuning of the required fuel air distribution. Mechanical flame holders are configured to act as aerodynamic bluff bodies, thus creating a low velocity wake within an area downstream. However, modern gas turbine engines are generally designed to operate at an increased through mass flow ratio. Accordingly, augmentors that include bluff bodies may have a reduced stability which limits the operability flight map, and also limits the engine/augmentor envelope. This limit is established by the basic stability characteristic of the bluff body.

BRIEF DESCRIPTION OF THE INVENTION

In one aspect of the invention, a method for fabricating a gas turbine engine augmentor system is provided. The method includes fabricating an outer casing having at least one channel defined therein, fabricating a centerbody having at least one channel defined therein, fabricating a plurality of turbine frame vanes, wherein each turbine frame vane includes a first sidewall having a first channel defined therein, a second sidewall having a second channel defined therein, and at least one cross-fire tube extending between the first sidewall and the second sidewall, and coupling the plurality of turbine frame vanes to the augmentor outer casing and to the centerbody such that the first sidewall first channel formed on a first turbine frame vane, the second sidewall second channel formed on a second turbine frame vane, the augmentor channel, and the centerbody channel define a substantially contiguous trapped vortex chamber.

In another aspect, an augmentor for a gas turbine engine is provided. The augmentor includes an augmentor outer casing having at least one channel defined therein, a centerbody having at least one channel defined therein, and a plurality of turbine frame vanes including at least a first turbine frame vane and a second turbine frame vane, wherein each turbine frame vane includes a first sidewall having a first channel defined therein, a second sidewall having a second channel defined therein; and a cross-fire tube extending between the first sidewall and the second sidewall. The plurality of turbine frame vanes are coupled to the augmentor outer casing and the centerbody such that the first sidewall first channel formed on the first turbine frame vane, the second sidewall second channel formed on the second turbine frame vane, the augmentor channel, and the centerbody channel define a substantially contiguous trapped vortex chamber.

In a further aspect, a gas turbine engine is provided. The engine includes an augmentor that includes an augmentor outer casing having at least one channel defined therein, a centerbody having at least one channel defined therein, and a plurality of turbine frame vanes including at least a first turbine frame vane and a second turbine frame vane, wherein each turbine frame vane includes a first sidewall having a first channel defined therein, a second sidewall having a second channel defined therein; and a cross-fire tube extending between the first sidewall and the second sidewall. The plurality of turbine frame vanes are coupled to the augmentor outer casing and the centerbody such that the first sidewall first channel formed on the first turbine frame vane, the second sidewall second channel formed on the second turbine frame vane, the augmentor channel, and the centerbody channel define a substantially contiguous trapped vortex chamber.

DETAILED DESCRIPTION OF THE INVENTION

Figure 1:
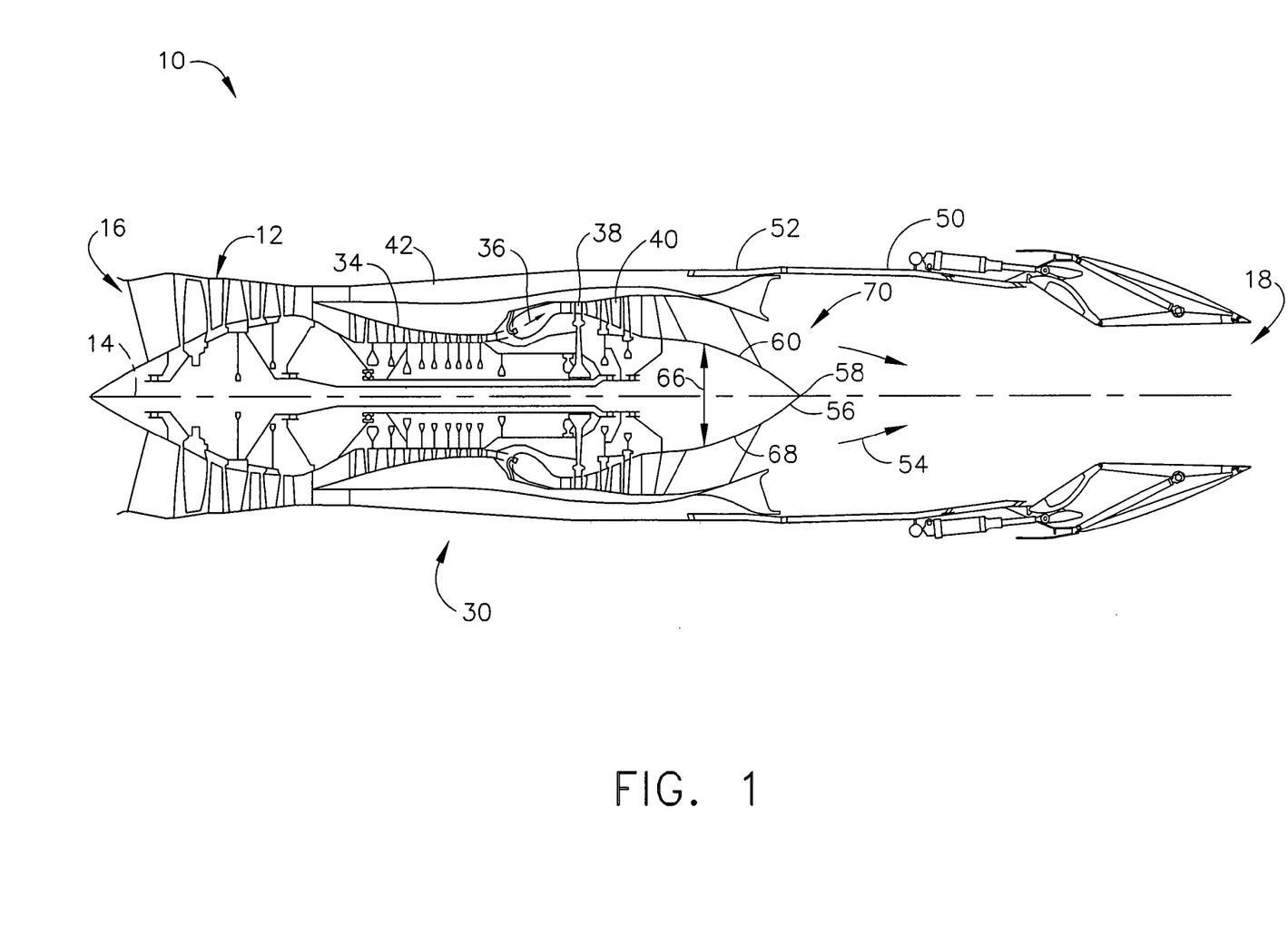
FIG. 1 is a cross-sectional side view of an exemplary gas turbine engine.

FIG. 1 is a cross-sectional side view of a gas turbine turbofan engine 10 including a fan assembly 12. In one embodiment, engine 10 is an F110 engine and is available from General Electric Aircraft Engines, Cincinnati, Ohio. Engine 10 has a generally longitudinally extending axis or centerline 14 extending from an inlet end 16 of engine 10 aftward to an exhaust end 18 of engine 10. Engine 10 includes a core engine 30 which includes a high pressure compressor 34, a combustor 36, a high pressure turbine 38, and a power turbine or a low pressure turbine 40, all arranged in a serial, axial flow relationship. Engine 10 also includes a bypass duct 42 surrounding the core engine 30. In alternative embodiments, engine 10 also includes a core fan assembly (not shown).

An exhaust nozzle 50 extends aftward from core engine 30 and includes a nozzle portion 52. Nozzle portion 52 extends between nozzle 50 and core engine 30 and defines a portion of an outer boundary of an engine exhaust flowpath 54. More specifically, nozzle portion 52 directs combustion gases discharged from core engine 30 and airflow exiting bypass duct 42 downstream through exhaust nozzle 50.

A bluff body or centerbody 56 extends aftward from core engine 30 to an apex 58 formed at an aft end 60 of centerbody 56. More specifically, centerbody 56 is concentrically aligned with respect to nozzle 50 and extends aftward along engine centerline 14. Centerbody 56 is contoured and has a variable width 66 measured axially along centerbody 56 such that centerbody 56 defines a convergent-divergent path through nozzle 50. Accordingly, an outer surface 68 of centerbody 56 defines an inner boundary of engine exhaust flowpath 54.

During operation, airflow enters engine 10 through fan assembly 12. The air is compressed and a portion of the air is discharged downstream at an increased pressure and temperature to high-pressure compressor 34. The remaining portion of the fan discharge air enters fan bypass duct 42. Fuel is introduced to core engine 30 wherein the air and fuel are mixed and ignited within core engine 30 to generate hot combustion gases. Specifically, pressurized air from high pressure compressor 34 is mixed with fuel in combustor 36 and ignited, thereby generating combustion gases. Such combustion gases drive high pressure turbine 38 which drives high pressure compressor 34. The combustion gases are discharged from high pressure turbine 38 into low pressure turbine 40. The core airflow is then discharged from low pressure turbine 40 and directed towards an augmentor system 70.

Figure 2:
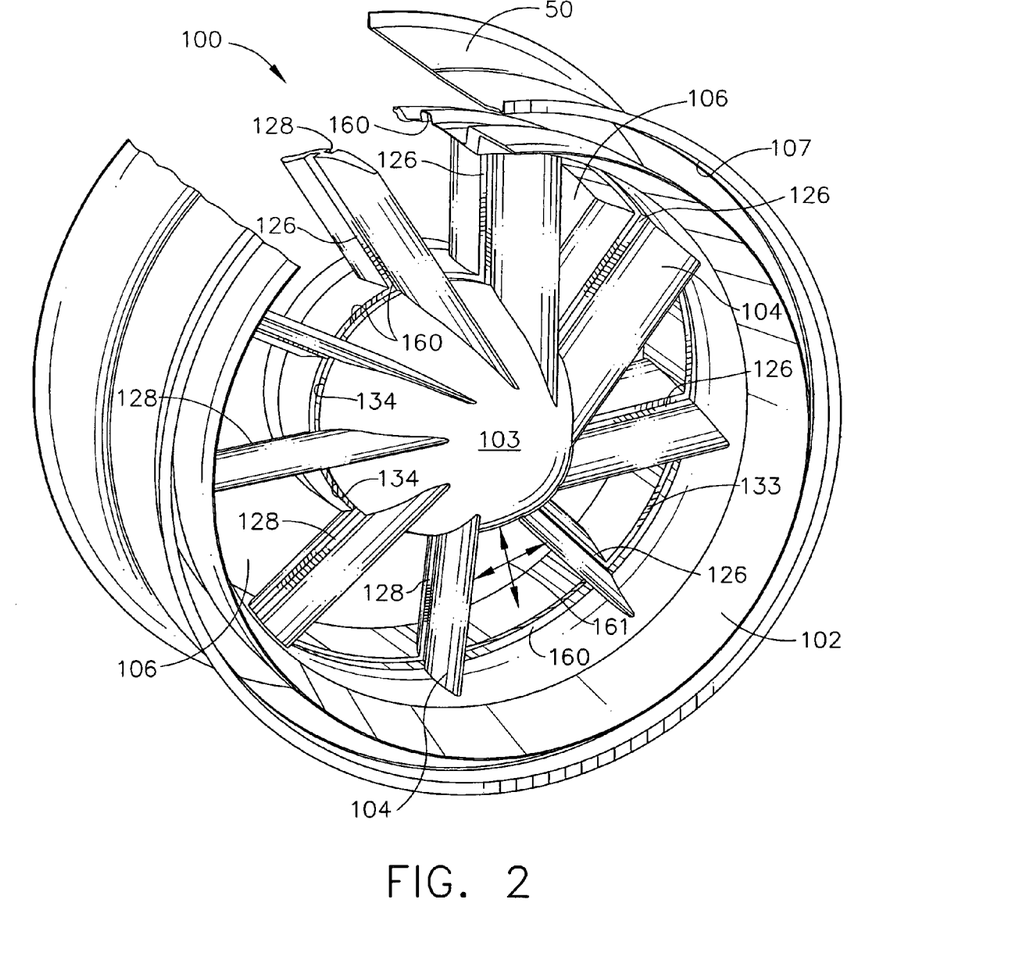
FIG. 2 is a perspective view of an exemplary augmentor system that can be used with the gas turbine engine shown in FIG. 1.
Figure 3:
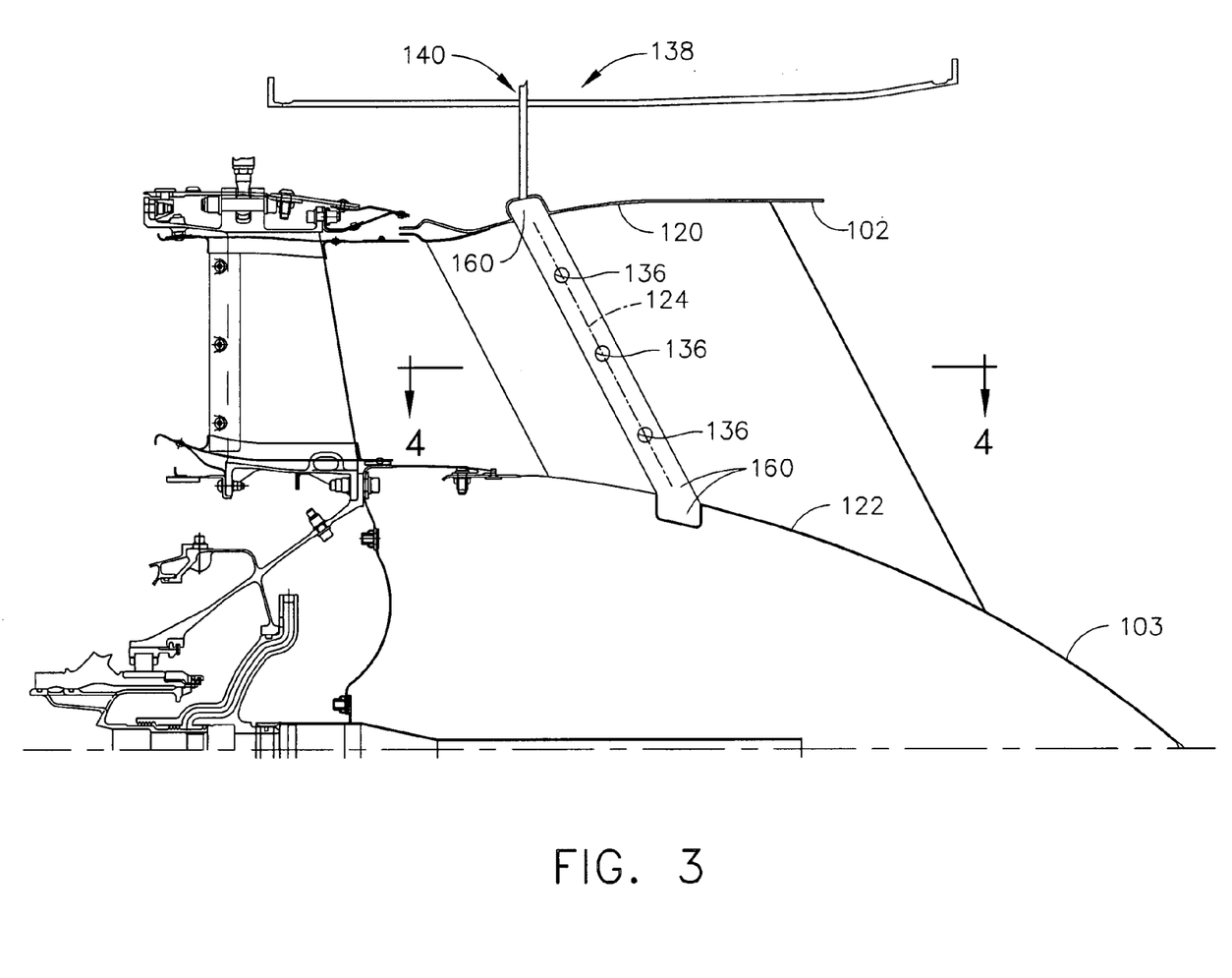
FIG. 3 is a side view of the augmentor system shown in FIG. 2.
Figure 4:
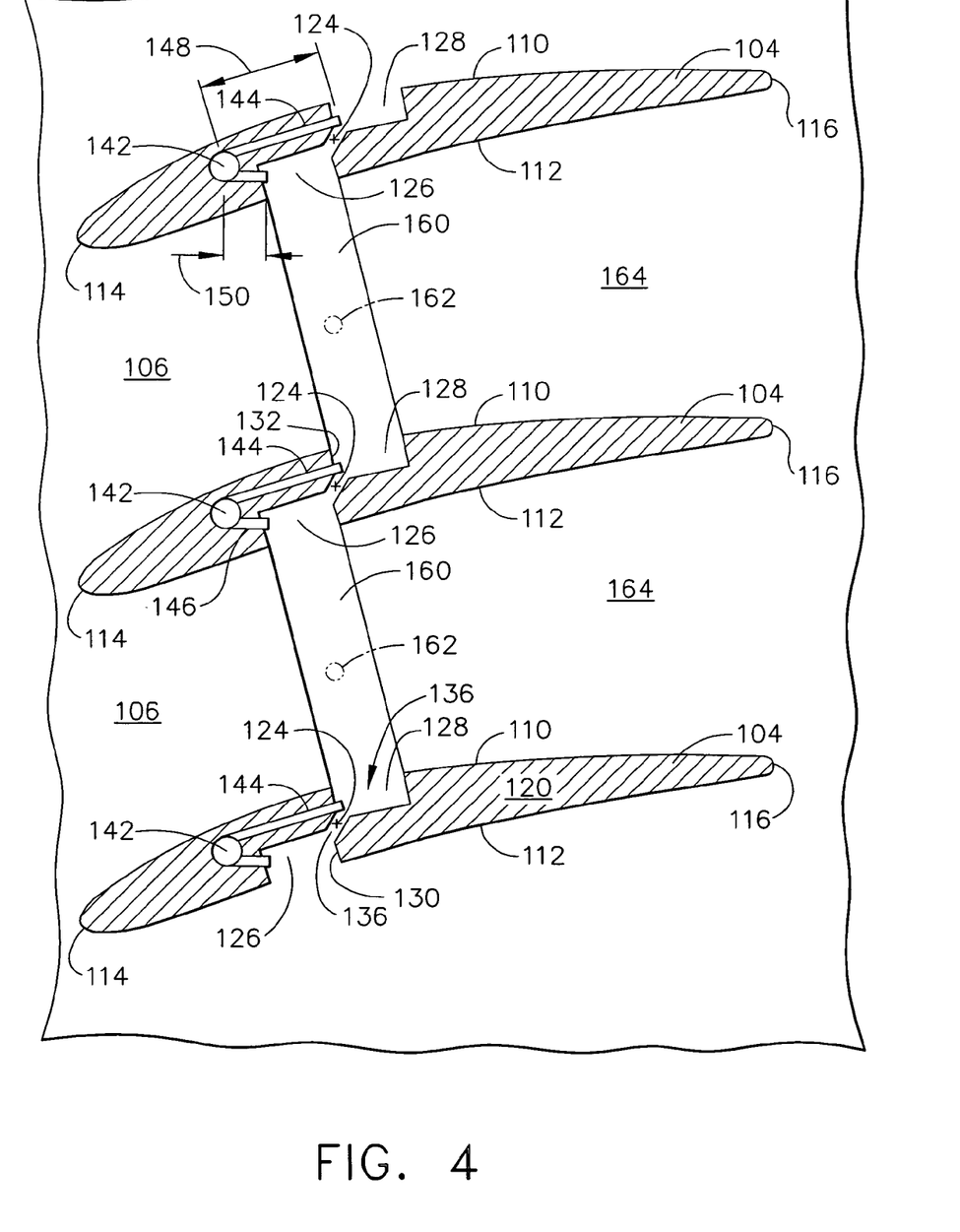
FIG. 4 is a rolled out view of the augmentor system shown in FIG. 3 taken along line AA.

FIG. 2 is a perspective view of an augmentor system 100 that can be used with gas turbine 10 (shown in FIG. 1). FIG. 3 is a side view of augmentor system 100 (shown in FIG. 2). FIG. 4 is a rolled out view of a portion of augmentor system 100 (shown in FIG. 3) taken along line AA. Augmentor system 100 is disposed downstream from core engine 30 and receives core engine combustion gases discharged from core engine 30 and airflow exiting bypass duct 42. System 100 creates a temperature rise and a pressure rise within engine 10 without the use of turbomachinery included within core engine 30 to generate thrust from engine 10.

Specifically, augmentor system 100 includes an outer casing 102, a centerbody 103, and a plurality of turbine frame vanes 104 coupled to outer casing 102 and centerbody 103 such that plurality of turbine frame vanes 104 form a plurality of passages 106. Specifically, a single passage 106 is defined between radially adjacent turbine frame vanes 104. In the exemplary embodiment, augmentor system 100 is annular and extends circumferentially around an inner periphery 107 of engine nozzle 50.

In the exemplary embodiment, each turbine frame vane 104 includes a first sidewall 110 and a second sidewall 112. First sidewall 110 is generally convex and defines a suction side of turbine frame vane 104, and second sidewall 112 is generally concave and defines a pressure side of turbine frame vane 104. Sidewalls 110 and 112 are joined at a leading edge 114 and at a trailing edge 116. More specifically, first sidewall 110 is curved and aerodynamically contoured to join with second sidewall 112 at leading edge 114 and trailing edge 116.

In the exemplary embodiment, each turbine frame vane 104 includes an upper surface 120 that is coupled to outer casing 102, a lower surface 122 that is coupled to centerbody 103, and an axis of symmetry 124. In the exemplary embodiment, each turbine frame vane 104 also includes a first channel 126 and a second channel 128 that each extend between upper surface 120 and lower surface 122. First channel 126 is positioned such that an aft end 130 of first channel 126 is approximately parallel to axis of symmetry 124, and second channel 128 is positioned such that a forward end 132 of second channel 128 is approximately parallel to axis of symmetry 124. Augmentor system 100 further includes a plurality of third channels 133 defined within outer casing 102 and a plurality of fourth channels 134 defined within an outer surface of centerbody 103. In the exemplary embodiment, a single channel 126, 128, 133, and 134 define a continuous and/or contiguous channel 160, i.e. a trapped vortex chamber 160 around an outer periphery 161 of each respective passage 106. Contiguous as used herein is defined as connecting without a break; and/or within a common boundary. Moreover, and in the exemplary embodiment, channels 126, 128, 133, and 134 each have a substantially rectangular cross-sectional area. In another embodiment, channels 126, 128, 133, and 134 each have a cross-sectional area other than rectangular such as, but not limited to, square, triangular, or semi-circular. Each turbine frame vane 104 also includes at least one opening 136, i.e. a cross-fire tube 136, that extends between first channel 126 and second channel 128. In another embodiment, each turbine frame vane 104 includes a plurality of openings 136 that extend between first channel 126 and second channel 128.

Augmentor assembly 100 also includes a fueling system 138 that includes a fuel manifold 140 configured to supply fuel to each turbine frame vane 104. More specifically, each turbine frame vane 104 includes an opening 142, or fuel inlet 142, that extends between upper surface 120 of each turbine frame vane 104 and at least partially through turbine frame vane 104. A first tube 144 and a second fuel tube 146 are each coupled in flow communication to opening 142 to facilitate channeling fuel from fuel manifold 140 through each turbine frame vane 104 via openings 142, through each fuel tube 144, 146, and into each respective trapped vortex chamber 160. First tube 144 includes a first length 148 and second fuel tube 146 includes a second length 150 that is different than first length 148. In the exemplary embodiment, first length 148 and second length 150 are variably sized to facilitate channeling a predetermined quantity of fuel into each respective trapped vortex chamber 160.

In operation, when augmentor system 100 is activated, at least a portion of the combustion air is channeled around each respective turbine frame vane 104 and impinges on channels 126, 128, 133, 134 thus creating trapped vortex chamber 160 between each respective turbine frame vane 104. Fuel is channeled from fuel manifold 140 through each respective turbine frame vane 104 via openings 142, through each fuel tube 144, 146, and into trapped vortex chamber 160. The fuel is ignited in trapped vortex chamber 160 using at least one igniter 162. After the fuel is ignited in a first trapped vortex chamber 160 the ignition sequence is propagated into each respective trapped vortex chamber 160 through openings 136. More specifically, the continuous vortex chamber 160 formed in a first passage 106 facilitates stabilizing the propagation to adjacent vane passages 106 through cross fire tubes 136 thus lighting passsages 106 sequentially. Moreover, with subsequent flame spreading, the combustion process will consume the appropriate oxygen for increasing the gas temperatures generating a resultant increase in engine thrust.

In the exemplary embodiment, an aft section 164 of each respective trapped vortex chamber 160 is cooled using fan bypass duct air. Cooling the aft portion of each trapped vortex chamber 160 facilitates reducing the chargeable cooling penalty as compared to convential augmentors by mixing the cooling with the fuel to maximize temperature rise, and not bypass the combustion. More specifically, a first portion of the oxygen rich fan bypass air is channeled to trapped vortex chamber 160, a second portion of the fan bypass air is used to facilitate cooling a tailpipe liner, and the remaining portion of fan bypass air is consumed in the combustion process.

Figure 5:
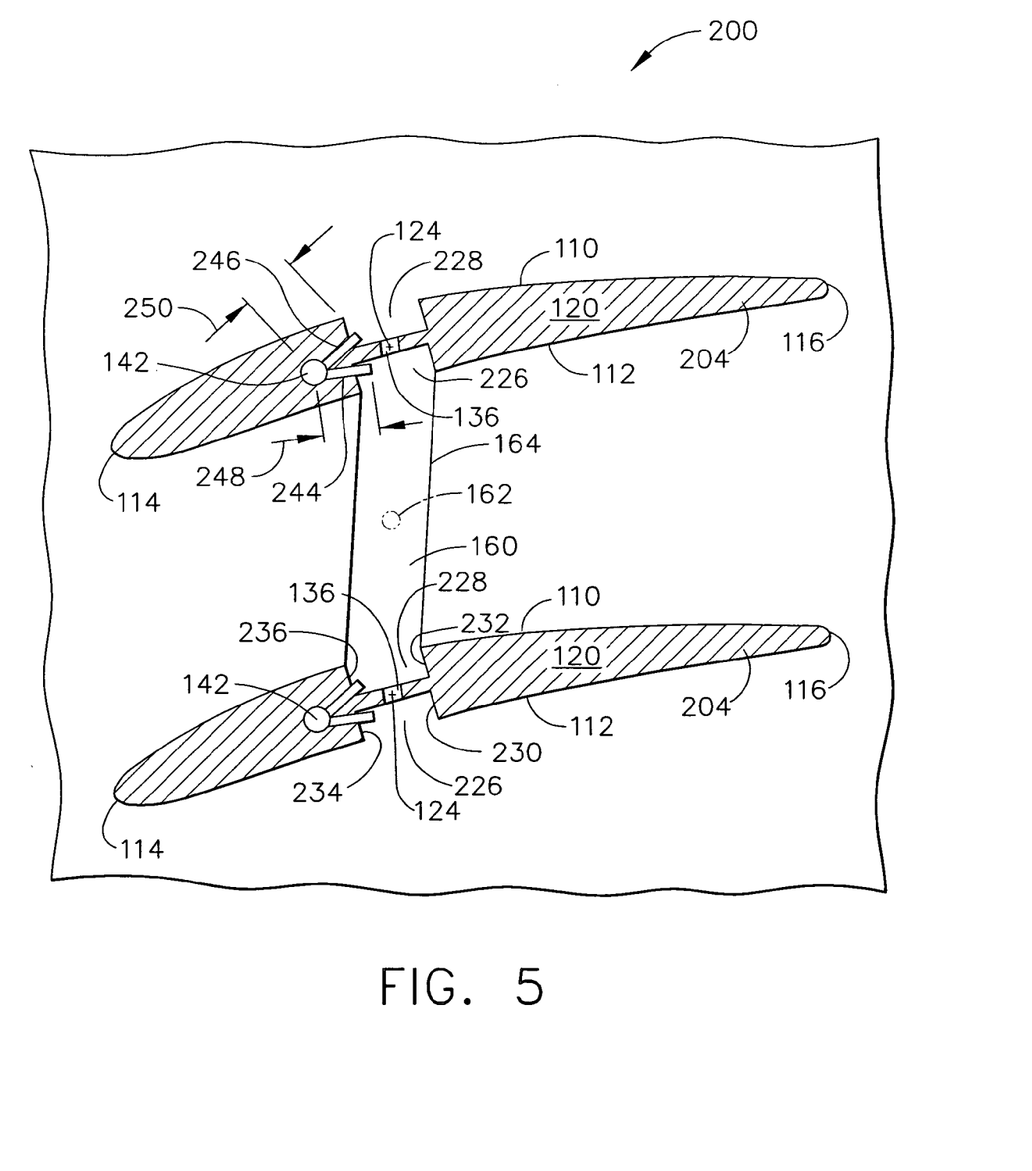
FIG. 5 is a rolled out view of another exemplary augmentor system that can be used with the gas turbine engine shown in FIG. 1.

FIG. 5 is a rolled out view of a view of an exemplary augmentor system 200. Augmentor system 200 is substantially similar to augmentor system 100, (shown in FIG. 4) and components of augmentor system 200 that are identical to components of augmentor system 100 are identified in FIG. 5 using the same reference numerals used in FIG. 4.

Augmentor system 200 is disposed downstream from core engine 30 and receives core engine combustion gases discharged from core engine 30 and airflow exiting bypass duct 42. System 200 creates a temperature rise and a pressure rise within engine 10 without the use of turbomachinery included within core engine 30 to generate thrust from engine 10.

Specifically, augmentor system 200 includes outer casing 102, centerbody 103, and a plurality of turbine frame vanes 204 coupled to outer casing 102 and centerbody 103 such that plurality of turbine frame vanes 204 form plurality of passages 106. Specifically, a single passage 106 is defined between radially adjacent turbine frame vanes 204. In the exemplary embodiment, augmentor system 200 is annular and extends circumferentially around inner periphery 107 of engine nozzle 50.

In the exemplary embodiment, each turbine frame vane 204 includes a first sidewall 110 and a second sidewall 112. First sidewall 110 is generally convex and defines a suction side of turbine frame vane 104, and second sidewall 112 is generally concave and defines a pressure side of turbine frame vane 104. Sidewalls 110 and 112 are joined at a leading edge 114 and at a trailing edge 116. More specifically, first sidewall 110 is curved and aerodynamically contoured to join with second sidewall 112 at leading edge 114 and trailing edge 116.

Each turbine frame vane 104 includes upper surface 120, lower surface 122, and axis of symmetry 124. In the exemplary embodiment, each turbine frame vane 104 includes a first channel 226 and a second channel 228 that extend between upper surface 120 and lower surface 122. In another exemplary embodiment, first channel 226 and second channel 228 extend only partially between upper surface 120 and lower surface 122. In another exemplary embodiment, first channel 226 and a second channel 228 are each divided into a plurality of individual channels that extend between upper surface 120 and lower surface 122. First channel 226 is positioned such that an aft end 230 of first channel 226 is approximately parallel to an aft end 232 of second channel 228 and such that a forward end 234 of first channel 226 is approximately parallel to a forward end 236 of second channel 228. Each turbine frame vane 204 also includes at least one opening 136, i.e. a cross-fire tube 136, that extends between first channel 226 and second channel 228. In another embodiment, each turbine frame vane 204 includes a plurality of openings 136 that extend between first channel 226 and second channel 228.

Augmentor assembly 200 also includes fueling system 138 that includes fuel manifold 140 that is configured to supply fuel to each turbine frame vane 204. More specifically, each turbine frame vane 204 includes opening 142 that extends between upper surface 120 and at least partially through turbine frame vane 204. First fuel tube 244 and a second fuel tube 246 are each coupled to opening 142 to facilitate channeling fuel from fuel manifold 140 through each turbine frame vane 204 via openings 142, through each fuel tube 244, 246, and into each respective channel 226, 228. First tube 244 includes a first length 248 and second fuel tube 246 includes a second length 250 that is approximately equal to first length 248. In the exemplary embodiment, first length 248 and second length 250 are selectively sized to facilitate channeling a predetermined quantity of fuel into trapped vortex chamber 160.

In operation, when augmentor system 200 is activated, at least a portion of the combustion air is channeled around each respective turbine frame vane 204 and impinges on channels 226, 228, 133, and 134 thus creating a trapped vortex chamber 160 between each respective turbine frame vane 104. Fuel is channeled from fuel manifold 140 through each respective turbine frame vane 204 via openings 142, through each fuel tube 244, 246, and into trapped vortex chamber 160. The fuel is ignited in trapped vortex chamber 160 using at least one igniter 162. After the fuel is ignited in a first trapped vortex chamber 160 the ignition sequence is propagated into each respective trapped vortex chamber 160 through openings 136. More specifically, the continuous vortex chamber 160 formed in a first passage 106 facilitates stabilizing the propagation to adjacent vane passage 106 through cross fire tubes 136 thus lighting passsages 106 sequentially. Moreover, with subsequent flame spreading, the combustion process will consume the appropriate oxygen for increasing the gas temperatures generating a resultant increase in engine thrust.

In the exemplary embodiment, aft sections 164 of each respective trapped vortex chamber 160 are cooled using fan bypass duct air. Cooling the aft portion of each trapped vortex chamber 160 facilitates reducing the chargeable cooling penalty as compared to convential augmentors by mixing the cooling with the fuel to maxiimize temperature rise, and not bypass the combustion. More specifically, a first portion of the oxygen rich fan bypass air is channeled to trapped vortex chamber 160, a second portion of the fan bypass air is used to facilitate cooling a tailpipe liner, and the remaining portion of fan bypass air is consumed in the combustion process.

The above-described augmentor systems each include a plurality of turbine frame vanes that circumscribe an inner periphery of the gas turbine engine. Each respective turbine frame vane includes a first channel or passage and a second channel or passage on an opposite side of the first channel. When combustion air is channeled into the augmentor system, the channel formed in the outer casing, the channel formed in the centerbody, and the turbine vane channels define a trapped vortex chamber between each respective pair of adjacent turbine frame vanes. Accordingly, when fuel is injected into each respective trapped vortex chamber and ignited a continuous trapped vortex chamber is formed within an inner periphery of each respective augmentor passage. As a result, an augmentor system is provided which provides an integrated package with high through velocity stability and heat release capability in a minimal sized package while reducing engine weight and increasing the engine performance envelope.

While the invention has been described in terms of various specific embodiments, those skilled in the art will recognize that the invention can be practiced with modification within the spirit and scope of the claims.

What is claimed is:

1. A method for fabricating a gas turbine engine augmentor system, said method comprising:
   fabricating an augmentor outer casing having at least one channel defined therein;
   fabricating a centerbody having at least one channel defined therein;
   fabricating a plurality of turbine frame vanes, wherein each turbine frame vane includes a first sidewall having a first channel defined therein, a second sidewall having a second channel defined therein, and at least one cross-fire tube extending between the first sidewall and the second sidewall; and
   coupling the plurality of turbine frame vanes to the augmentor outer casing and to the centerbody such that the first sidewall first channel formed on a first turbine frame vane, the second sidewall second channel formed on a second turbine frame vane, the augmentor channel, and the centerbody channel define a substantially contiguous trapped vortex chamber.

2. A method in accordance with claim 1 further comprising fabricating at least one turbine frame vane that includes a fuel inlet that extends at least partially through the at least one turbine frame vane to facilitate channeling a predetermined quantity of fuel through the fuel inlet and into the contiguous trapped vortex chamber.

3. A method in accordance with claim 1 wherein providing a plurality of turbine frame vanes comprises providing a plurality of turbine frame vanes wherein each turbine frame vane includes a first sidewall having a first channel defined therein, and a second sidewall having a second channel defined therein, the second channel formed aft of the first channel with respect to an engine axis of symmetry.

4. A method in accordance with claim 1 further comprising coupling at least one igniter to the gas turbine engine augmentor to facilitate igniting fuel within the trapped vortex chamber.

5. A method in accordance with claim 1 further comprising coupling the plurality of turbine frame vanes to the augmentor outer casing and the centerbody such that the plurality of turbine frame vanes form a plurality of contiguous trapped vortex chambers that are coupled in flow communication around an inner periphery of the gas turbine engine.

6. An augmentor for a gas turbine engine, said augmentor comprising:
   an augmentor outer casing comprising at least one channel defined therein;
   a centerbody comprising at least one channel defined therein; and
   a plurality of turbine frame vanes comprising at least a first turbine frame vane and a second turbine frame vane, each said turbine frame vane comprising
      a first sidewall comprising a first channel defined therein;
      a second sidewall comprising a second channel defined therein; and
      a cross-fire tube extending between said first sidewall and said second sidewall;
   said plurality of turbine frame vanes coupled to said augmentor outer casing and said centerbody such that said first sidewall first channel formed on said first turbine frame vane, said second sidewall second channel formed on said second turbine frame vane, said augmentor channel, and said centerbody channel define a substantially contiguous trapped vortex chamber.

7. An augmentor in accordance with claim 6 wherein at least one said turbine frame vane comprises a fuel inlet that extends between an upper surface of said turbine frame vane and at least partially through an interior of said turbine frame vane to facilitate channeling a predetermined quantity of fuel into said trapped vortex chamber.

8. An augmentor in accordance with claim 7 wherein said augmentor further comprises a first tube and a second tube in flow communication with said fuel inlet to facilitate channeling a predetermined quantity of fuel into said trapped vortex chamber.

9. An augmentor in accordance with claim 7 wherein each said turbine frame vane comprises a first fuel tube in flow communication with said fuel inlet and a second fuel tube in flow communication with said fuel inlet, said first fuel tube configured to channel fuel into a first trapped vortex chamber and said second fuel tube configured to channel fuel into a second trapped vortex chamber different than said first trapped vortex chamber.

10. An augmentor in accordance with claim 9 wherein said first fuel tube comprises a first length and said second fuel tube comprises a second length that is greater than said first length.

11. An augmentor in accordance with claim 9 wherein said first fuel tube comprises a first length and said second fuel tube comprises a second length that is substantially equal to said first length.

12. An augmentor in accordance with claim 8 wherein said augmentor comprises at least one igniter configured to ignite the fuel channeled from said first fuel tube and said second fuel tube.

13. An augmentor in accordance with claim 6 wherein said first sidewall comprises an outer surface that is approximately convex and said second sidewall comprises an outer surface that is approximately convex.

14. A gas turbine engine comprising:
   an augmentor comprising:
   an augmentor outer casing comprising at least one channel defined therein;
   a centerbody comprising at least one channel defined therein; and
   a plurality of turbine frame vanes comprising at least a first turbine frame vane and a second turbine frame vane, each said turbine frame vane comprising
      a first sidewall comprising a first channel defined therein;
      a second sidewall comprising a second channel defined therein; and
   said plurality of turbine frame vanes coupled to said augmentor outer casing and said centerbody such that said first sidewall first channel formed on said first turbine frame vane, said second sidewall second channel formed on said second turbine frame vane, said augmentor channel, and said centerbody channel define a substantially contiguous trapped vortex chamber.

15. A gas turbine engine in accordance with claim 14 wherein each said turbine frame vane comprises a fuel inlet that extends between an upper surface of said turbine frame vane and at least partially through an interior of said turbine frame vane.

16. A gas turbine engine in accordance with claim 15 wherein each said turbine frame vane comprises a cross-fire tube.

17. A gas turbine engine in accordance with claim 15 wherein each said turbine frame vane comprises a first fuel tube coupled to said fuel inlet and a second fuel tube coupled to said fuel inlet, said first fuel tube and said second fuel tube configured to channel fuel into a first trapped vortex chamber and a second trapped vortex chamber.

18. A gas turbine engine in accordance with claim 17 wherein said first fuel tube comprises a first length and said second fuel tube comprises a second length that is greater than said first length.

19. A gas turbine engine in accordance with claim 17 wherein said augmentor comprises at least one igniter configured to ignite the fuel channeled from said first fuel tube and said second fuel tube.

20. A gas turbine engine in accordance with claim 14 wherein said first sidewall comprises an outer surface that is approximately convex and said second sidewall comprises an outer surface that is approximately convex.

* * * * *